(12) United States Patent
Kumar et al.

(10) Patent No.: US 9,034,633 B2
(45) Date of Patent: May 19, 2015

(54) METHOD FOR BIOREMEDIATION OF HIGHLY AROMATIC HYDROCARBON WASTES

(75) Inventors: Manoj Kumar, Faridabad (IN); Mahendra Pratap Singh, Faridabad (IN); Harinder Kaur Dua, Faridabad (IN); Vivekanand Kagdiyal, Faridabad (IN); Amarjeet Singh Sarpal, Faridabad (IN); Vijay Kumar Chhatwal, Faridabad (IN); Ravinder Kumar Malhotra, Faridabad (IN); Anand Kumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 957 days.

(21) Appl. No.: 12/711,533

(22) Filed: Feb. 24, 2010

(65) Prior Publication Data

US 2010/0274069 A1    Oct. 28, 2010

(30) Foreign Application Priority Data

Apr. 24, 2009  (IN) .......................... 1103/MUM/2009

(51) Int. Cl.
*A62D 3/02* (2007.01)
*B09C 1/10* (2006.01)
*C02F 11/02* (2006.01)
*C02F 3/34* (2006.01)
*B09B 3/00* (2006.01)

(52) U.S. Cl.
CPC ... *B09C 1/10* (2013.01); *B09B 3/00* (2013.01); *A62D 3/02* (2013.01); *C02F 11/02* (2013.01); *C02F 3/34* (2013.01)

(58) Field of Classification Search
CPC .......... B09B 3/00; C02F 11/06; C02F 11/02; C02F 11/04; A62D 3/176; A62D 3/38; Y02E 20/18
USPC ......... 435/290.1–290.4, 262.5; 210/601, 606, 210/610, 611; 588/405
See application file for complete search history.

(56) References Cited

U.S. PATENT DOCUMENTS

| | | | |
|---|---|---|---|
| 5,232,596 A * | 8/1993 | Castaldi | 210/603 |
| 5,716,839 A * | 2/1998 | Varadaraj et al. | 435/262 |
| 5,753,122 A * | 5/1998 | Taylor et al. | 210/611 |
| 6,027,285 A * | 2/2000 | Angel et al. | 405/172 |
| 6,121,040 A * | 9/2000 | Sakuranaga et al. | 435/262.5 |
| 2002/0187545 A1* | 12/2002 | Calcavecchio et al. | 435/262 |

FOREIGN PATENT DOCUMENTS

WO    WO2008/015688 A2 *   2/2008  ............... A62D 3/02

OTHER PUBLICATIONS

Narve Aske, Harald Kallevik and Johan Sjoeblom. "Determination of Saturate, Aromatic, Resin and Asphaltenic (SARA) Components in Crude Oils by Means of INfrared and Near-Infrared Spectroscopy." Energy & Fuels. American Chemical Society. vol. 15, pp. 1304-1312. 2001.*

* cited by examiner

*Primary Examiner* — Michael Hobbs
(74) *Attorney, Agent, or Firm* — Oblon, McClelland, Maier & Neustadt, L.L.P.

(57) ABSTRACT

Disclosed herein is a method for biopile-based bioremediation of hydrocarbon waste with high aromatic content. The method comprises of isolating specific microorganisms and preparing microbial blend, preparing biopile, adding the microbial blend into the biopile, providing nutrient, aeration and watering of biopile.

21 Claims, No Drawings

METHOD FOR BIOREMEDIATION OF HIGHLY AROMATIC HYDROCARBON WASTES

FIELD OF THE INVENTION

This invention, in general, relates to a method for bioremediation of highly aromatic hydrocarbon wastes. In particular, the present invention provides a method for biopile-based bioremediation of hydrocarbon waste with high aromatic content using a blend of microorganisms capable of degrading aromatic hydrocarbons.

BACKGROUND OF THE INVENTION

Highly aromatic waste containing polycyclic aromatic hydrocarbons (PAHs) are generated by several industries such as gas plants, blast furnaces coke oven condensation, wood preservation plants, petrochemical industry sites, and other industries. PAHs are of great environmental concern because of their mutagenic and/or carcinogenic potential and their nature to persist in the environment for very longer durations. Various methods have been utilized for treatment/remediation/disposal of highly aromatic waste sludge. These methods generally include permanent removal of the contaminated soil to a secure landfill, incineration, indirect thermal treatment, aeration, venting, air sparging and bioremediation.

Of these, removal of contaminated soil to landfills is no longer an attractive alternative on account of the high excavation, transportation, disposal costs, and a high potential for residual liability. Further, the contaminant has to be dumped into specially constructed pits with leachate collection system in the landfill. Due to space constraints and expensive construction of such pits, this option is not practical. Further, this method is not a permanent solution.

Incineration and indirect thermal treatment can be achieved either on-site or off-site, but both the processes involve excavation, handling and treatment of whole contaminated soil as well as significant amounts of soil adjacent to the contaminated soil. The soil must then either be transported to the treatment facility or else the treatment apparatus must be installed on-site. In either case, these methods generally involve enormous transportation, handling cost and require large amounts of energy to combust or volatilize the contaminants. Other elaborate and expensive techniques, which have been utilized, involve excavation and treatment of the contaminated soil using multi-step unit operations for separating and recovering the soil from the contaminants. The processes mentioned above are prohibitively expensive.

Bioremediation is generally considered to be a promising approach to remediate contaminated soils, which utilizes the ability of certain microbes to transform harmful substances in to nontoxic compounds. Microorganisms, like all living organisms, need nutrients (such as nitrogen, phosphate, and trace metals), carbon and energy to survive. Bioremediation may be affected under aerobic and anaerobic conditions. Main requirements for effective bioremediation are: a biodegradable organic substrate, an appropriate active microbial community (consortium) and bioavailability of contaminants. Sometimes bioremediation requires further biostimulation with nutrients or some specific analogue substrate. Bioremediation is a cost effective, less energy intensive and eco-friendly method for disposal of hydrocarbon sludge. However, biodegradation of highly aromatic waste is a difficult task on account of their polynuclear chemical structure, low aqueous solubility and high toxicity. Various methods have been tried in the prior arts for treatment of the aromatic wastes.

U.S. Pat. No. 5,055,196 to Darian et al., discloses a process for treating soil or sludge to remove contaminants. More particularly, this method relates to a process in which inorganic contaminants, such as metal or metal salts, or organic contaminants, such as polychlorinated biphenyls (PCBs), are removed from water-wet soil and sludge by contacting the contaminated water-wet mixture with a solvent containing a comminuting surfactant.

U.S. Pat. No. 5,427,944 to Lee et al. teaches a process for biodegradation of polycyclic aromatic hydrocarbon contaminants using a mixed bacteria culture of *Achromobacter* sp. and *Mycobacterium* sp and nutrient. The mixed bacteria culture was utilized for in situ or ex situ bioremediation of contaminated soil, or in any of various conventional bioreactors to treat contaminated liquids such as landfill leachates, groundwater or industrial effluents.

U.S. Pat. No. 6,251,657 to Hunter et al. discloses an apparatus and method for anaerobic biodegradation, bioremediation or bioprocessing of hydrocarbon dissolved in aqueous matrix, such as wastewater, ground water, or slurry and dissolved alkanes, alkenes, aromatic hydrocarbons and/or halogenated hydrocarbons that are metabolized or co-metabolized by denitrifying bacteria.

U.S. Pat. No. 6,381,899 to McDole, describes a method for converting well drilling cuttings that contain petroleum hydrocarbons to an environmentally friendly humus-like product wherein salt, if present, is washed there from, the washed cuttings mixed with a feedstock having a carbon and nitrogen content sufficient to encourage a biopile composting reaction, forming an environmentally acceptable plant growth enhancing humus-like product by continuing the biopile composting reaction until (1) the biopile is reduced in weight and/or volume to a total biopile weight and/or volume that approaches the original weight and/or volume of the drill cuttings before the feedstock was added thereto, and (2) the total petroleum hydrocarbon content of the biopile is reduced to an environmentally friendly level for spreading on the earth's surface.

U.S. Pat. No. 6,503,746 to Daane et al. relates to a method of isolating bacterial strains of *Paenibacillus validus* that degrade polyaromatic hydrocarbons and further use these strains for bioremediation.

U.S. Pat. No. 7,118,906 to Raghukumar et al. describes a process for removal of polycyclic hydrocarbons phenanthrene and chrysene from wastewater and other contaminated sites by using white-rot lignin modifying fungus strain Flavodon flavus NRRL 30302.

The US 20030100098 to Haggblom et al. discloses a bioremediation method of polycyclic aromatic hydrocarbon employing a PAH degrading bacterial stain *P. naphthalenovorans* of the *Paenibacillus* genus.

The US 20050221468 discloses a process and a system for in situ remediation of contaminated soil by the distribution of treated sewage effluent into the soil thereby promoting the number and growth of naturally occurring microorganisms for the remediation process.

The US 20060275887 to Miller et al. teaches a contaminant-degrading mycobacterium composition for remediation of contaminated soil having selected contaminants such as PAHs, polychlorinated phenols (PCPs), methyl tertiary butyl ethers (MTBEs) and the like. Such a composition includes a seed for plant capable of growing in the presence of contaminant and contaminants degrading mycobacteria on the seed, the mycobacterium being capable of degrading the selected contaminant.

The conventional bioremediation techniques utilizing indigenous microorganisms alone or in combination with naturally occurring exogenous microorganisms are not always effective for bioremediation of polycyclic aromatic hydrocarbons. Polycyclic aromatic hydrocarbons (PAHs) are strongly adsorbed with organic material present in the soil, which limits their biodegradation in land farming approach and often-high levels of residual contaminants are left. Hence, the aromatic waste cannot be bioremediated using normal hydrocarbon degrading bacteria and by land farming techniques.

Therefore, there exists a need to develop a method which can remove highly aromatic compounds especially PAHs in an eco-friendly, economical and intensive manner.

SUMMARY OF THE INVENTION

It is a principal object of the present invention to provide a method for bioremediation of highly aromatic hydrocarbon waste in an efficient and environmental friendly manner. It is another object of the present invention to provide a synergistic combination of selective microorganisms to develop a blend enabling effective degradation of highly hazardous aromatic waste and converting thereof into harmless and environment friendly substances.

Further object of the present invention is to provide a biopile method employing a blend of microorganisms for effective remediation and removal of highly aromatic waste, contaminated soil and slurries.

The above and other objects are attained in accordance with the following embodiments of the present invention, however, the described embodiments hereinafter is in accordance with the best mode of practice and the invention is not restricted to the particular embodiments.

In accordance with one preferred embodiment of the present invention, there is provided a method for bioremediation of highly aromatic hydrocarbon waste, wherein the method comprises of preparing a microbial blend capable of degrading aromatic hydrocarbons wherein microorganisms in the microbial blend are adsorbed on a biodegradable carrier, preparing a biopile comprising a mixture of the hydrocarbon waste, soil and a bulking agent, adding the microbial blend into the biopile followed with addition of nutrients to promote bioremediation reaction and maintaining aeration and moisture of the biopile for a time sufficient to complete the bioremediation of the highly aromatic hydrocarbon waste.

In accordance with another preferred embodiment of the present invention, there is provided a method for bioremediation of highly aromatic hydrocarbon waste, wherein the preparation of the microbial blend comprises of isolating the specific microorganism by selective enrichment technique in a suitable nutrient medium and developing a blend by mixing of isolated selected microorganisms enabling synergistic combination.

In accordance with another preferred embodiment of the present invention, there is provided a method for bioremediation of highly aromatic hydrocarbon waste, wherein the biopile comprises a layer of clean soil at the base of the biopile, a layer of aromatic waste soil mixed with bulking agent, perforated pipes, preferably of polyvinyl chloride (PVC) wrapped with fine cloth for aeration, drainage, and watering to be placed in side the biopile, a layer of clean soil at the top of the biopile and a covering of perforated plastic sheet.

DETAILED DESCRIPTION OF THE INVENTION

While this specification concludes with claims particularly pointing out and distinctly claiming that, which is regarded as the invention, it is anticipated that the invention can be more readily understood through reading the following detailed description of the invention and study of the included examples.

The present invention discloses an eco-friendly process for disposal of highly aromatic compounds in the hydrocarbon waste/sludge. The process involves bioremediation of aromatic hydrocarbons present in the hydrocarbon waste by biopile methodology employing specific microbial blend capable of degrading aromatic hydrocarbons including polycyclic aromatic hydrocarbons (PAHs).

The highly aromatic waste containing 50-100% w/w aromatics generally disposed by secure landfill, incineration, indirect thermal treatment, aeration, venting, air sparging and land farming. These conventional practices generally do not provide a practical, affordable technology for remediating aromatic sludge in an eco-friendly and intensive manner. In addition, the bioremediation of highly aromatic waste is also difficult. Conventional bioremediation techniques utilizing indigenous microorganisms alone or in combination with naturally occurring exogenous microorganisms is not always effective for bioremediation of polycyclic aromatic hydrocarbons, which are strongly resistant to biodegradation on account of their polynuclear chemical structure, low aqueous solubility and high toxicity. So, the aromatic waste cannot be bio-remediated using normal hydrocarbon degrading bacteria. There are some specific microbes that break PAHs to obtain carbon and energy for their growth and transform them into harmless substances consisting mainly of carbon dioxide, water and fatty acids. The bioremediation of PAHs according to the present invention can be achieved by biopile using specific microbial blend.

According to the present invention, the microorganisms capable of degrading PAHs are developed by the selective enrichment technique. A suitable nutrient medium for use during the enrichment process includes a nitrogen source, such as an ammonium salt and a phosphorus source, such as an alkali metal phosphate compound. A suitable nutrient system which can be effectively utilized during the enrichment process includes an ammonium salt and a phosphate compound, along with minor amounts of other conventional nutrients, wherein the molar ratio of elemental nitrogen to phosphorus is from about 5:1 to about 15:1, and more preferably from about 8:1 to about 12:1. A particularly preferred nutrient system for use during the enrichment process includes ammonium chloride, from about 5 to about 20 parts by weight of hydrated magnesium sulfate ($MgSO_4.7H_2O$) per 100 parts by weight of ammonium chloride, from about 5 to about 20 parts by weight of sodium chloride per 100 parts by weight of ammonium chloride, and from about 15 to about 50, and more preferably from about 20 to about 30 parts by weight of monobasic potassium phosphate ($KH_2PO_4$) per 100 parts by weight of ammonium chloride and traces of vitamins and trace elements. The foregoing nutrients are dissolved in a suitable amount of water to dissolve the nutrients and combined with appropriate quantities of a suitable initial primary food source and the mixed bacteria culture. A suitable initial primary food source is generally the aromatic hydrocarbon waste or its total petroleum hydrocarbon or mixture of 1-5 ring aromatic compounds, asphaltene fractions. Isolation of the pure desired microorganisms preferably of gram negative bacteria, is done by streaking on minimal salt agar medium containing 0.5-5% aromatic waste as carbon source. These plates are incubated at 30° C. Five microbial strains are obtained at the end of the enrichment cycle employing the aromatic hydrocarbon waste.

According to the present invention, the isolated microorganisms are acclimatized to grow in presence of the aromatic hydrocarbon waste. In particular, the acclimation process is carried out by adding samples of the contaminated soil or waste, which is to be remediated employing the isolated microorganisms. A nutrient system used during the process of acclimating the mixed bacteria culture to aromatics compounds desirably includes a magnesium source, such as a magnesium salt, and can optionally include other nutrients such as sodium, calcium and iron salts.

According to the present invention, the degradation ability of the isolated microorganisms to utilize various PAHs is determined by growing them, separately or in mixture, in mineral media containing one of the test aromatic hydrocarbon as sole carbon source. Quantitative degradation of PAHs i.e., phenanthrene, pyrene, beznoalphapyrene and dibenzothiophene at different concentrations is studied. For that the individual isolate or mixture is inoculated in 5 ml of mineral salt medium. After 48 hr growth the 5 ml culture is transferred into 20 ml fresh medium. After 48 hrs growth 20 ml culture is transferred to minimal salt 80 ml, which contained aromatic waste (1%) as carbon source. All experiments are carried out at 30° C. temperature in shaking condition. After incubation of 10 days the residual substrate is measured. The aromatic hydrocarbon waste degrading microorganisms showing highest growth and degradation potential have been identified as *Pseudomonas putida* IOC5a1, *Pseudomonas putida* IOCR1, *Pseudomonas fulva* IOCSAM1. Three microorganisms are mixed in equal ratio to reap the benefits of synergy of their degradation ability and get degradation of total range of the aromatics present in aromatic waste.

*Pseudomonas putida* IOC5a1, *Pseudomonas fulva* IOC SAM1 and *Pseudomonas putida* IOCR1 were deposited under the terms of the Budapest Treaty on the International Recognition of the deposit of Microorganisms for the Purposes of Patent Procedure (submitted to IDA-MTCC on Dec. 17,2007 as MTCC Nos. 5385,5802 and 5387, respectively). All restrictions imposed by the depositor on the availability to the public of the deposited biological material will be The consortia/microbial blend of the present invention are developed based on the growth ability of the isolated bacteria and to take advantage of synergy of microbial metabolism. The three microbes are combined to make the microbial blend for bioremediation and are used in present invention. The degradation potential of the microbial blend is examined in: Shake flask and Modified Strum test ($CO_2$ evolution measurement). The newly developed consortia could degrade more than 75-90% TPH in one month in shake flask while the result of Modified Strum test suggest that the microbial blend could "readily biodegrade" the aromatic wastes and 60-70% degradation is achieved in 30 days.

According to the present invention, after isolation and efficacy tests at laboratory scale the microbial consortia/blend are grown in a bioreactor. An inoculum for bioreactor, of the mixed culture of the present invention is prepared by first growing the individual microbe on separate agar plates in a conventional manner. After sufficient growth of the individual microbe is achieved, the microorganisms are transferred to a fresh agar plate for simultaneous growth in a mixed culture. After the mixed culture exhibits successful growth, it is transferred to a bioreactor containing a nutrient solution. The bioreactor preferably contains control devices for temperature, pH, agitation, aeration and stirring. Particularly preferred nutrient system for growth includes (g per liter) $KH_2PO_4$ (0.5-1.0), $K_2HPO_4$ (0.5-1.0), $Mg\ SO_4$ (0.5-1.0), $(NH4)_2SO_4$ (0.25-0.75), $KNO_3$ (0.25-0.75), Trace element (5 ml to 20 ml of solution) and Multi vitamin solution (0.5-5 ml), fermentable sugars as carbon source 1-5%. The trace element solution (gram per liter) comprises Nitrilotriacetic acid (1-1.5), $FeSO_4 \cdot 7H_2O$ (0.05-0.15), $MnCl2.4.H_2O$ (0.005-0.015), $CoCl_2.6H_2O$ (0.15-0.2), $CaCl_2.2H_2O$ (0.05-0.15), $ZnCl_2$ (0.05-0.15), $CuCl_2.H_2O$ (0.01-0.03), $H_3BO_3$ (0.01-0.02), $Na_2MOO_4$ (0.01-0.02), $Na_2SeO_3$ (0.015-0.02), $NiSO_4$ (0.01-0.03), $SnCl_2$ (0.01-0.03). The multivitamin solution (g/1) includes Biotin 0.001-0.003, Folic acid (0.001-0.003), Pyridoxine HCl (0.05-0.02), Thiamine HCl (0.002-0.008), Riboflavin (0.001-0.01), Nicotinic acid (0.002-0.01), Ca-Pentotheonate (0.002-0.01), Lipoic acid (0.0025-0.0075), Vitamin B12 (0.0005-0.0015), PABA (0.0025-0.0075).

According to the present invention, the appropriately grown microbial blend is adsorbed on suitable carrier and dispersed in soil while being supported on a carrier. The carrier used includes any known material so far as it can be applied to contaminated soil, which can firmly adsorb microorganisms to the surface and be helpful in transport and dispersal of final bioremediation agent. Furthermore, the carrier according to the present invention is made of the materials that can retain microorganisms thereon relatively mildly and thus allowing easy release of the microorganisms thus proliferated. In addition, the carrier is inexpensive and acts as a nutrient source for the microorganisms thus applied, particularly a nutrient source, which can be gradually released to advantage. Further, the carrier is a biodegradable material so that any problems arising from secondary contamination by residual carrier or the effect of applied microorganisms on the soil ecological system can be avoided. The biodegradable carrier preferably used according to the invention is a material, which gradually decomposes and disappears after the remediation of soil by the applied microorganisms. When such a carrier is used, after the disappearance of the carrier the microorganisms which have been released into soil are put in environments which are severe to growth such as competition with predominant native-born microorganisms in soil and predation by protozoan. The microorganisms are then driven out of soil and gradually decrease in number to extinction. As a result, the ecological system in soil can be restored to the original state.

The biodegradable carrier material preferably employed herein in the method includes cornhusk, sugar industry waste or any agricultural waste. The water content of the carrier varies from 1% to 99% by weight, preferably from 5% to 90% by weight, more preferably from 10% to 85% by weight. When the water content of the carrier is too low, microorganisms find difficulty in survival. On the contrary, when the water content of the carrier is too high, the resulting carrier exhibits a deteriorated physical strength that makes itself difficult to handle. The carrier adsorbed microbial blend is tested for its efficacy in liquid medium as well in a biopile.

Biopiles, also known as biocells, bioheaps, biomounds and compost piles, are used to reduce concentrations of aromatic hydrocarbons including petroleum constituents in excavated soils through the use of bioremediation. This technology involves heaping contaminated soils into piles (or "cells") and stimulating aerobic microbial activity within the soils through aeration and/or addition of microbes by maintaining nutrients and moisture. The enhanced microbial activity results in degradation of adsorbed petroleum-product constituents through microbial respiration. Biopiles are above-ground, engineered systems that use oxygen, generally from air, to stimulate the growth and reproduction of aerobic bacteria which, in turn, degrade the petroleum constituents adsorbed in soil. Biopiles are commonly aerated by forcing air to move through the biopile by injection or extraction through slotted or perforated piping placed throughout the pile.

According to the present invention, before preparing the biopile a representative sample of soil and highly aromatic hydrocarbon waste are analyzed for determining nutrient status and treatment parameters. The area around the site for preparation of the biopile is remarketed and the site cleared of grass, debris etc. To avoid migration of contaminants into underlying soil, an impermeable base is prepared either of cement—concrete or by placing thick plastic sheet and the site is marked by brick wall.

According to an exemplary embodiment of the present invention, the hydrocarbon waste/sludge containing aromatics are mixed with equal volume of virgin soil and placed on an impermeable base to form a soil pile i.e. highly aromatic waste-soil mixture. Bulking agent is added to the highly aromatic waste-soil mixture in order to enhance aeration and increase porosity inside the biopile. Subsequently, the microbial blend adsorbed on a biodegradable carrier is dispersed followed by adding the nutrients to the hydrocarbon waste-soil-bulking agent mixture to promote the bioremediation reaction. The nutrients are mixed by tilling and the aromatic waste-soil-bulking agent-microbial blend-nutrient mixture is placed in the biopile. Aeration and moisture content is maintained within the biopile for a time sufficient to complete the bioremediation of the highly aromatic hydrocarbon waste According to the present invention, the aromatic content in the hydrocarbon waste is in between 20 to 100% by weight, preferably between 30-100%, more preferably between 50-100% by weight. The hydrocarbon waste includes polycyclic aromatic hydrocarbons. The bulking agent is added at a ratio of 5-50% w/w, preferably between 10-30% w/w, of the hydrocarbon waste-soil mixture. The bulking agent employed is selected from bagasse, wood chips, twigs, rice husk, *pinus* needles, bark, post peelings, fruit waste, stones, individually or in mixture thereof.

According to an embodiment of the present invention, more virgin soil is added to the hydrocarbon waste-soil mixture to reduce total petroleum hydrocarbon waste (TPH) to 5-30%. The microbial blend and nutrient system developed is mixed with the aromatic waste-soil-bulking agent mixture. The microbial blend is added variably between 0.1-15% w/w based on the aromatic content of the hydrocarbon waste. Preferably, the microbial blend has a concentration of 0.5 to 10% by weight, preferably from 0.75 to 5% by weight, more preferably from 1% to 2% by weight of the biopile.

The nutrients according to the present invention are applied at the rate of 4 mg to 50 mg/100 kg of aromatic waste-soil-bulking agent mixture after making its 10-50% solution in water. Materials containing nitrogen, phosphorus and essential minerals, trace elements vitamins are used preferably as nutrients. Preferably, a culture solution suitable for the growth of the microorganisms in the microbial blend is used. The culture solution used widely includes a material having a meat juice, a yeast extract, a malt extract, bactopeptone, glucose, inorganic salts, mineral, etc. in admixture at a proper ratio. The ratio in the admixture varies with the kind of microorganisms employed in the microbial blend. Nutrients containing proper organic and inorganic constituents are added in addition to the aforementioned culture solution. According to the present invention, the nutrients employed include a mixture of yeast extract, potassium nitrate, ammonium phosphate in the ratio 2:1:0.1 to 1:0.1:0.01, more preferably 1:1:0.1.

According to a preferred embodiment of the present invention, the biopile comprises: a layer of soil at the base, a layer of the mixture of the aromatic waste, soil and a bulking agent, a pipe for aeration, drainage and addition of water, wherein the pipe is a perforated Polyvinyl chloride (PVC) pipe wrapped with fine cloth, a layer of soil above the mixture and a layer of perforated plastic sheet to cover the biopile and avoid volatile organic compounds (VOCs).

The water content within the biopile is maintained either by sprinkling the water at the top and sides of the biopile or using water reservoir or irrigation system (drip or soaker hoses). The addition of nutrients and moisture may be combined. The moisture content of the biopile is maintained preferably from 30% to 80% of the water retention capability of the soil-aromatic hydrocarbon waste mixture. When the water content is too low, microorganisms find difficulty in survival. On the contrary, when the water content is too high, it stops aeration. The aeration is maintained by passive diffusion of air using perforated pipes, extraction or injection of air with suitable device or by tilling at every month interval.

According to the present invention, the bioremediation is performed at a temperature suitable for the action of microorganisms between 3° C. to 50° C., preferably from 10° C. to 45° C., more preferably from 18° C. to 40° C. The temperature is maintained by heating, employing spraying and injection of hot water depending on the situation. In cold districts, a heat conductor is inserted into soil so that heat from a heat source can be transferred to soil. Alternatively, the heat conductor inserted in the biopile is electrically energized to heat the biopile. Any material which can transmit heat such as metal and ceramics are used as a heat conductor.

According to the present invention, the biopile additionally includes a leachate collection system, nutrient analyzer and other devices as per requirement. Samples from the biopile are collected at time zero and at every month interval, Sampling at each time interval is done by collecting ten sub-samples of approximately 50 g soil from random locations and depths inside the biopile using hollow GI pipe of appropriate dia (4 inch) with sharp ends and are analyzed for: TPH content, PAH content, microbiological parameters (total cultivable heterotrophs, PAH-degrading bacteria) and its toxicity. Additional nutrients, microbial blend can be added as per the requirement during treatment.

The present invention therefore provides a safe, effective and inexpensive means for eliminating highly aromatic sludge and soil contaminated with aromatics from environment in such a manner that the aromatics are converted to a growth enhancing humus-like environmentally acceptable product.

The following specific examples illustrate the process of this invention, but they should not be constructed as limiting the scope of the invention. Reasonable variations and modifications are possible within the scope of this disclosure without departing from the spirit and scope of this invention.

EXAMPLE 1

Isolation of Bacteria Capable of Degrading High Molecular Weight PAHs, Development of Microbial Blend and Evaluation in Liquid Media for Degradation of Highly Aromatic Sludge The nutrient media (basal salt media, BSM) used for enrichment process includes (grams per liter) 6.0 g of $Na_2HPO_4$, 3.0 g of $KH_2PO_4$, 4.0 g of $NH_4Cl$, 2.5 g yeast extract, 0.1 g of $MgSO_4$ and 2.5 ml of a trace element solution (milligrams per liter), 23 mg of $MnCl_2.2H_2O$, 30 mg of $MnCl_4.H_2O$, 31 mg of $H_3BO_3$, 36 mg of $CoCl_2.6H_2O$, 10 mg of $CuCl_2.2H_2O$, 20 mg of $NiCl_2.6H_2O$, 30 mg of $Na_2MoO_4.2H_2O$ and 50 mg $ZnCl_2$ (pH 7.0). Highly aromatic waste (2%, weight per volume) was used as carbon source and incubated at 30° C. on a rotary shaker (200 rpm) for 4 days. After four days 1 ml of the culture was transferred to fresh media containing crude oil (2%, weight per volume) and re-incubated for another four days. Following five cycles of such enrichment, 1 ml of the culture was diluted and plated on BSM agar plates containing crude oil as sole carbon source. The bacterial colonies obtained were further purified, by streaking on Luria-Bertani agar. The ability of the isolates to degrade various PAHs and highly aromatic was determined by growing it, separately, in BSM containing one of the test hydrocarbon as sole carbon source. The fastest growing strain with ability to grow on wide range of hydrocarbon was selected for further studied for Quantitative degradation of representative PAHs. Three potential strains were selected and a microbial blend was developed. These bacterial strains were identified by 16S r RNA partial gene sequencing and biochemical assays.

An inoculum of the mixed culture of the present invention was prepared by first growing the individual microbe on separate Luria agar plates in a conventional manner. After sufficient growth of the individual microbe is achieved, all three microbes were transferred to a fresh agar plate for simultaneous growth of all organisms together in a mixed culture. After the mixed culture exhibits successful growth, it can be transferred to a suitable vessel containing a nutrient solution. The vessel preferably should contain control devices for temperature, pH, agitation, aeration and stirring. The temperature was kept 30 degree C., stirring 500 rpm and air 2 L/min. Used nutrient system for growth includes (gram per liter) $KH_2PO_4$ 0.1.5-2.0, $K_2HPO_4$ 1.5-2.0, $MgSO_4$ 1.0-2.0, $(NH_4)_2SO_4$ 2.0-4.0, $KNO_3$, 1-2, Trace element 22 ml to 32 ml of solution and Multi vitamin solution 3-7 ml, 8-10% glucose as carbon source. The composition of trace element solution (gram per liter) is Nitrilotriacetic acid 1-1.5, $FeSO_4.7H_2O$, 0.05-0.15, $MnCl_2.4H_2O$ 0.005-0.015, $CoCl_2.6H_2O$ 0.15-0.2, $CaCl_2.2H_2O$ 0.05-0.15, $ZnCl_2$ 0.05-0.15, $CuCl_2.H_2O$ 0.01-0.03, $H_3BO_3$ 0.01-0.02, $Na_2MoO_4$ 0.01-0.02, $Na_2SeO_3$ 0.015-0.02, $NiSO_4$ 0.01-0.03, $SnCl_2$ 0.01-0.03. The composition of trace element solution multi-vitamin solution (gram per liter) is Biotin 0.001-0.003, Folic acid 0.001-0.003, Pyridoxine HCl 0.05-0.02, Thiamine HCl 0.002-0.008, Riboflavin 0.001-0.01, Nicotinic acid 0.002-0.01, Ca-Pentotheonate 0.002-0.01, ipoic acid 0.0025-0.0075, Vitamin $B_{12}$ 0.0005-0.0015, PABA 0.0025-0.0075. The appropriately grown mixed microbial culture of the invention was adsorbed on previously UV sterilized corn floor in ratio 1:6 (volume per weight). This material was packed in UV sterilized plastic bag keeping 40-60% space for air and it was sealed. The media used for biodegradation consisted of BSM supplemented with 0.25% yeast extract. Runs to determine the biodegradation of sludge with respect to incubation time were carried out: 1) in 250-ml Erlenmeyer flasks containing 50 ml of media and 5 g of sludge and The flasks were inoculated with 3 g of microbial blend adsorbed on carrier material; described above the flasks were incubated at 30° C. and at 220 rpm. Residual TPH content was determined by extraction with 1:1 mixture of hexane and toluene. The solvent layer was separated in separating funnel and transferred to pre-weighted vial. The solvent was evaporated in fume hood and residual oil was weighed to determine total petroleum hydrocarbons. 2) by Modified Strum test ($CO_2$ evolution measurement). A boiled treatment control and an inoculated control devoid of carbon-source were also prepared under same experimental conditions. To prepare the boiled treatment control, the media was inoculated exactly as the experiment set and immediately, was boiled for 5 min. The boiled media was centrifuged (8000 rpm, 10 min) and supernatant obtained was supplemented with various test hydrocarbons.

TABLE 1

Degradation of aromatic waste by microbial blend

% Degradation in comparison to zero time PAH content

| | Shake flask experiments | | Modified Strum test | |
|---|---|---|---|---|
| No of Days | Control 1 | Inoculated with microbial blend developed in present invention | Control 1 | Inoculated with microbial blend developed in present invention |
| 7 | 3 | 25 | 2 | 14 |
| 14 | 7 | 45 | 4 | 35 |
| 21 | 10 | 82 | 5 | 58 |
| 30 | 14 | 89 | 8 | 73 |
| 40 | 22 | 97 | 9 | 78 |

EXAMPLE 2

Designing of Biopile and Degradation of Aromatic Hydrocarbon Waste

Biodegradation studies were carried out in the biopile in plastic boxes (20 cm×20 cm×50 cm) at 30 degree C., over a period of 4 months. The waste taken for the trial was highly aromatic coke oven gas condensate (COGC), which is generated in blast furnace and contains 100% aromatics. The coke oven gas condensate sludge contained monoaromatics and polyaromatics like fluorine 7-methyl benzanthracene, beta-naphthol, 9,10-dihydroanthracene, naphthenoaromatics and other substituted PAHs. The sludge was mixed with equal volume of virgin soil and bulking agent bagasse at the rate of 10% to the soil-sludge mixture. A layer (around 3 cm) of clean soil at the base of the pile then layer of contaminated soil mixed with bulking agent. Perforated PVC pipes (0.5 cm diameter) wrapped with fine cloth for aeration, drainage, and watering to be placed in side the pile. In the first biopile together with nutrients ($KNO_3$ and yeast extract in 1:1 (w/w)) at the dosing rate of 0.4% w/w of sludge-soil-bulking agent weight) at the beginning of the treatment microbial blend disclosed in the present invention was added to achieve final cell count of $5.0 \times 10^8$ cfu/g. The second biopile only was equipped similarly to previous one, except with out inoculation. In the third set no nutrient and inoculum was introduced and it served as control. In all system a layer (around 3 cm) of clean soil at the top of the pile and was covered with perforated plastic sheet to avoid VOCs. All system was mixed at 15 days intervals and water was sprinkled at a week intervals to maintain the moisture. Nutrients and microbial blend was added at zero day, one-month, 2 months and 3 months interval. Sample would be collected at time zero and at every month interval. Sampling at each time interval is done by collecting eight sub-samples of approximately 5 g soil from random locations and depths inside the biopile using hollow GI pipe of appropriate diameter (0.5 inch) with sharp ends. Samples were analyzed for: TPH content, PAH content and Microbiological parameters (total cultivable heterotrophs, PAH-degrading bacteria). The following table presents the % degradation in TPH at different time intervals:

TABLE 2

% degradation at different intervals in the biopile

| Days | % degradation | | |
|---|---|---|---|
| | Bioagumented biopile | Biopile with nutrients | Control biopile |
| 30 | 56 | 21 | 12 |
| 60 | 65 | 27 | 17 |
| 90 | 87 | 32 | 20 |
| 120 | 97 | 35 | 22 |

While this invention has been described in detail with reference to certain preferred embodiments, it should be appreciated that the present invention is not limited to those precise embodiments rather, in view of the present disclosure, which describes the current best mode for practicing the invention, many modifications and variations, would present themselves to those skilled in the art without departing from the scope and spirit of this invention. This invention is susceptible to considerable variation in its practice within the spirit and scope of the appended claims.

We claim:

1. A method for bioremediation of highly aromatic hydrocarbon waste, comprising:
   a) preparing a microbial blend capable of degrading aromatic hydrocarbons wherein microorganisms in the microbial blend are adsorbed on a biodegradable carrier;
   b) preparing a biopile comprising a mixture of the hydrocarbon waste, soil and a bulking agent, wherein the highly aromatic hydrocarbon waste has an aromatics content of 100% w/w;
   c) adding the microbial blend into the biopile followed with addition of nutrients to promote bioremediation reaction; and
   d) maintaining aeration and moisture of the biopile for a time sufficient to complete the bioremediation of the highly aromatic hydrocarbon waste,
   wherein the bacteria of the microbial blend are *Pseudomonas putida* IOCa1 (MTCC No. 5385), *Pseudomonas putida* IOCR1 (MTCC No. 5802) and *Pseudomonas fulva* IOCSAM1 (MTCC No. 5387).

2. The method according to claim 1, wherein the highly aromatic hydrocarbon waste includes polycyclic aromatic hydrocarbon (PAHs).

3. The method according to claim 1, wherein the bacteria are used in equal ratio to form the microbial blend.

4. The method as claimed in claim 1, wherein the microbial blend has a concentration of 0.5 to 10% by weight of biopile.

5. The method according to claim 1, wherein the biodegradable carrier is an agricultural waste.

6. The method according to claim 1, wherein the nutrients are compounds containing nitrogen, phosphorus, mineral, trace element or vitamins or mixtures thereof.

7. The method according to claim 1, wherein the nutrients used is a mixture of yeast extract and potassium nitrate and ammonium phosphate in a ratio of 2:1:0.1 to 1:0.1:0.01.

8. The method according to claim 1, wherein the nutrients added are 0.01-5% by weight of waste-soil-bulking agent mixture.

9. The method according to claim 1, wherein the bulking agent is selected from bagasse, wood chips, twigs, rice husk, *pinus* needles, bark, post peelings, fruit waste, stones or mixture thereof.

10. The method as claimed in claim 1, wherein the bulking agent is present in an amount of 5-50% of the hydrocarbon waste-soil mixture.

11. The method according to claim 1, wherein the moisture content in said biopile is 20 to 90%, of the water retention capability of biopile.

12. The method according to claim 1, wherein the bioremediation is carried out at a temperature range of 5 to 50° C.

13. The method according to claim 1, wherein the biopile comprises:
   a) a layer of soil at the base;
   b) a layer of the mixture of the highly aromatic hydrocarbon waste, soil and a bulking agent;
   c) a pipe for aeration, drainage and addition of water;
   d) a layer of clean soil above the mixture of the hydrocarbon waste, soil and a bulking agent; and
   e) a layer of perforated plastic sheet to cover the biopile.

14. The biopile according to claim 13, wherein the pipe is a perforated pipe of polyvinyl chloride (PVC) wrapped with fine cloth.

15. The method as claimed in claim 1, wherein the microbial blend has a concentration of from 0.75 to 5% by weight of the biopile.

16. The method as claimed in claim 1, wherein the microbial blend has a concentration of from 1% to 2% by weight of the biopile.

17. The method as claimed in claim 1, wherein the bulking agent is present in an amount of from 10 to 30% of the mixture of the highly aromatic hydrocarbon waste and the soil.

18. The method according to claim 1, wherein the moisture content in said biopile is from 30 to 80% of the water retention capability of the biopile.

19. The method according to claim 1, wherein the bioremediation is carried out at a temperature range of from 10 to 45° C.

20. The method according to claim 1, wherein the bioremediation is carried out at a temperature range of from 20 to 40° C.

21. A method for bioremediating a highly aromatic hydrocarbon waste comprising one or more polycyclic aromatics, comprising:
   growing a plurality of bacteria in one or more nutrient media wherein each nutrient medium comprises a highly aromatic hydrocarbon containing 100% w/w of aromatic compounds as the sole carbon source; then
   isolating the bacteria to obtain one or more selectively enriched microorganisms;
   preparing a microbial blend comprising a plurality of the selectively enriched microorganisms, wherein the microbial blend is adsorbed on a biodegradable carrier;
   preparing a biopile comprising one or more highly aromatic hydrocarbon wastes containing 100% w/w of aromatic compounds, soil and one or more bulking agents;
   mixing the microbial blend, the biopile and one or more biopile nutrients to promote a bioremediation reaction; and
   maintaining aeration and moisture of the biopile for a time sufficient to complete bioremediation of the highly aromatic hydrocarbon waste,
   wherein the bacteria of the microbial blend are *Pseudomonas putida* IOCa1 (MTCC No. 5385), *Pseudomonas putida* IOCR1 (MTCC No. 5802) and *Pseudomonas fulva* IOCSAM1 (MTCC No. 5387).

* * * * *